United States Patent [19]
Brink

[11] Patent Number: 5,944,167
[45] Date of Patent: Aug. 31, 1999

[54] SCRAPER BLADE FOR PRIMARY BELT SCRAPER

[75] Inventor: Arend Jacobus Brink, Witbank, South Africa

[73] Assignee: Scorpio Conveyor Products (Proprietary) Limited, Witbank, South Africa

[21] Appl. No.: 09/119,529

[22] Filed: Jul. 21, 1998

[30] Foreign Application Priority Data

Jul. 21, 1997 [ZA] South Africa ............................ 97/6409

[51] Int. Cl.⁶ .................................................. B65G 45/12
[52] U.S. Cl. ............................................ 198/497; 198/499
[58] Field of Search ................................ 198/497, 499

[56] References Cited

U.S. PATENT DOCUMENTS 5,011,002  4/1991  Gibbs ...................................... 198/497
5,197,587  3/1993  Malmberg ................................ 198/497
5,692,595  12/1997  Gilbert .................................. 198/497 X

FOREIGN PATENT DOCUMENTS 573688  12/1993  European Pat. Off. ................ 198/494
197806  6/1978  United Kingdom .................... 198/497

Primary Examiner—James R. Bidwell
Attorney, Agent, or Firm—Venable; George H. Spencer; Ashley J. Wells

[57] ABSTRACT

A composite scraper blade which is suitable for use with a primary belt scraper which includes a support formed from a first material and an abrasion resistant scraping element which is formed from a second material and which is engaged with the support.

9 Claims, 3 Drawing Sheets

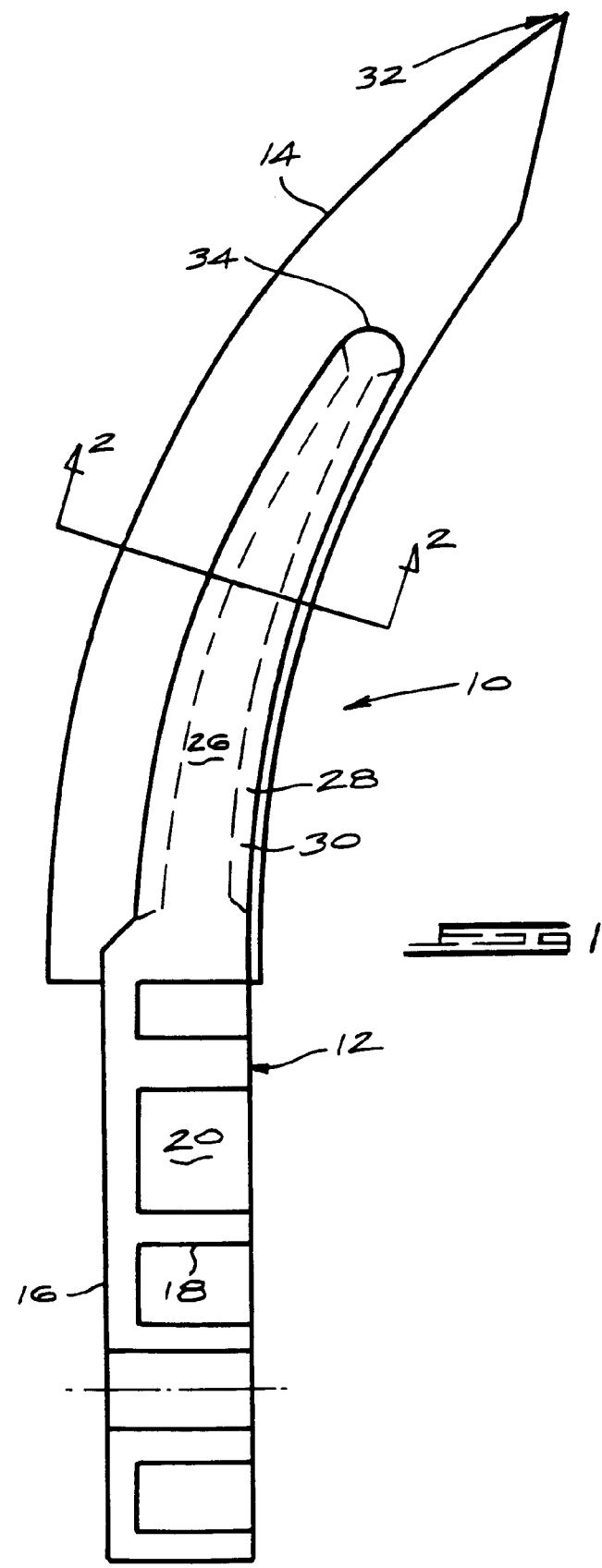

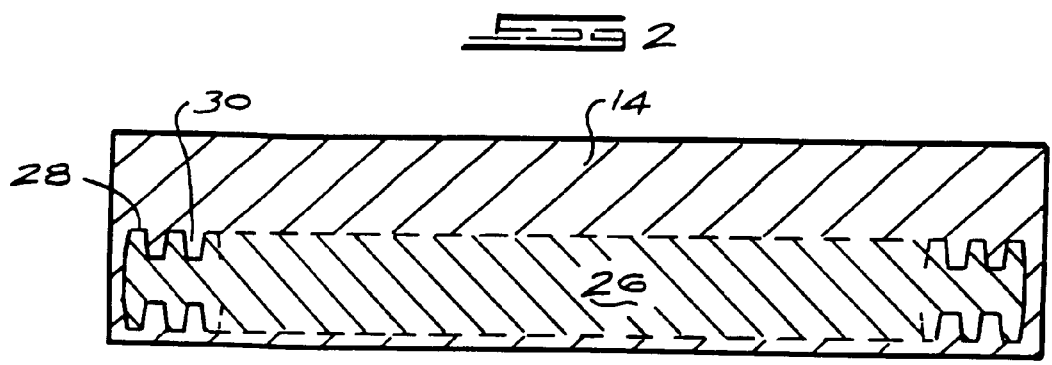
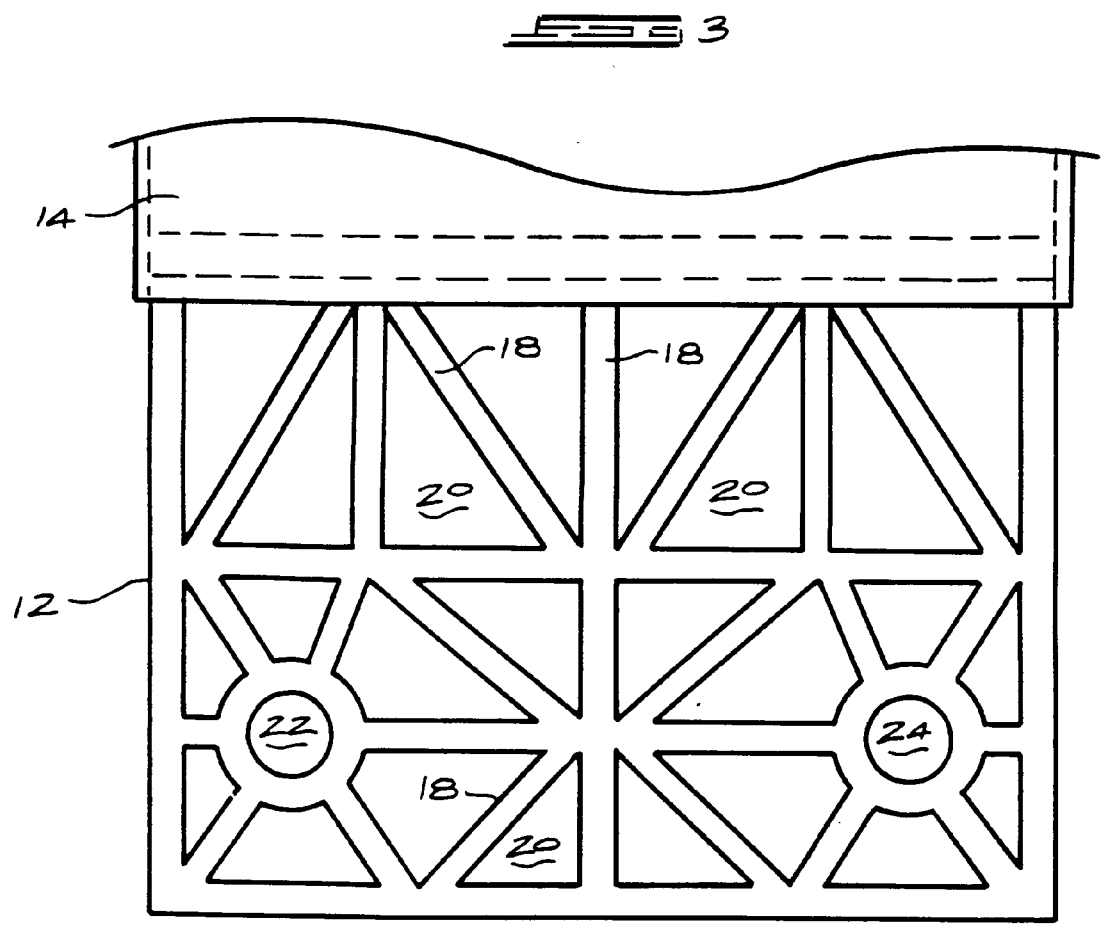

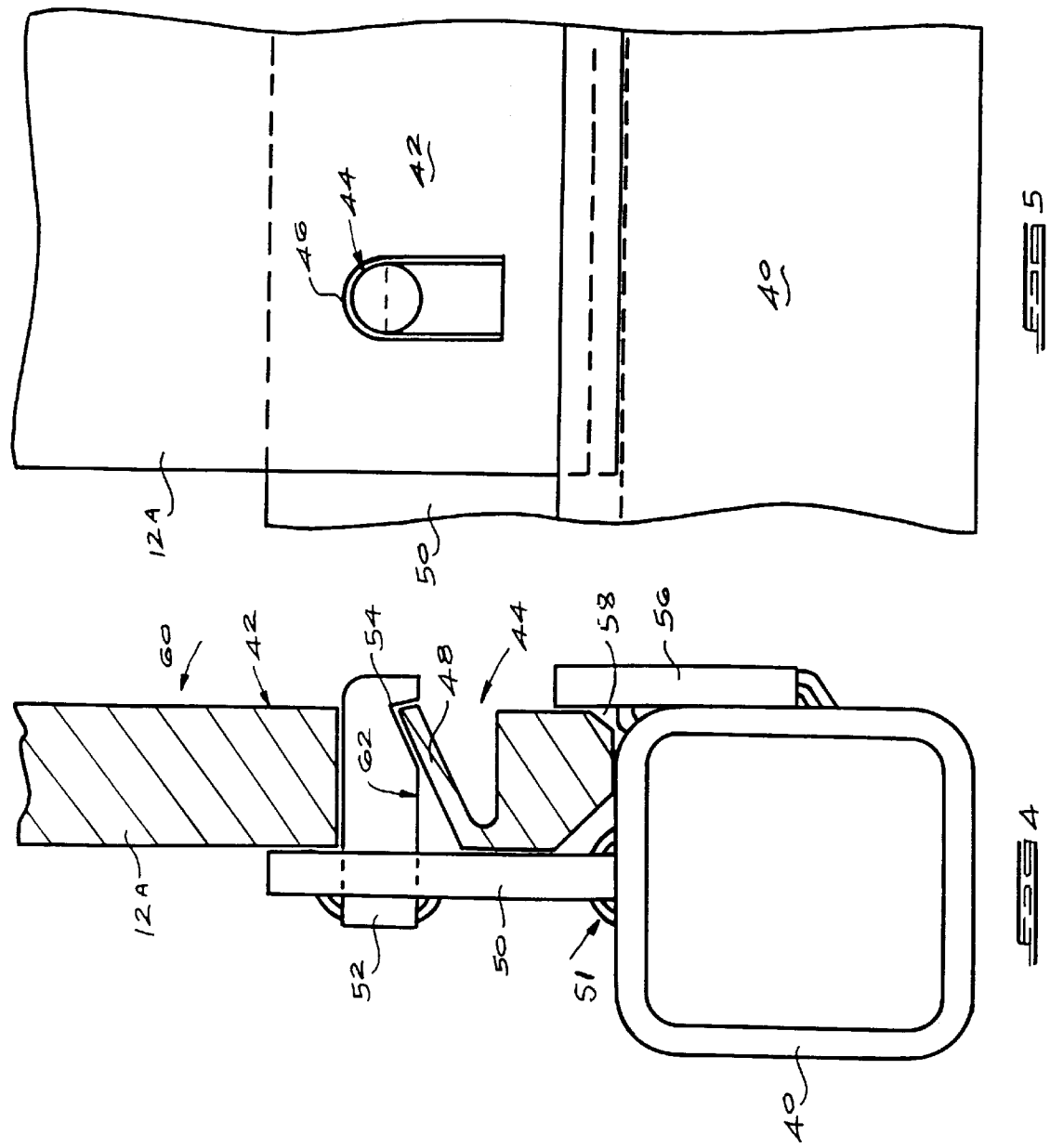

5,944,167

SCRAPER BLADE FOR PRIMARY BELT SCRAPER

BACKGROUND OF THE INVENTION

This invention relates to a primary belt scraper.

A scraper of this type may be used alone or in conjunction with one or more so-called secondary scrapers wherever a dual cleaning system is required. The primary scraper is mounted on a head pulley of a conveyor belt and removes the bulk of the material which adheres to the belt. By careful design of the blades of a primary scraper it is possible to compensate for blade wear to a substantial extent.

Use has been made of polyurethane for primary scraper blades. This material is satisfactory in many respects but is fairly expensive, an aspect which is compounded by the fact that an entire blade is discarded when the scraping portion has become worn.

SUMMARY OF THE INVENTION

The invention provides a composite scraper blade which is suitable for use with a belt scraper which includes a support formed from a first material and an abrasion resistant scraping element which is formed from a second material and which is engaged with the support.

The first material may be more rigid than the second material.

The first material may be less expensive than the second material.

The first material may be a first plastics material.

The second material may be a second plastics material.

In one embodiment of the invention the first material is nylon or polyamide and the second material is polyurethane.

The support may be engaged with the scraping element in any appropriate way. The support may for example be shaped to engage with a complementary recess in the scraping element. Preferably however the scraping element is moulded onto and bonded to the support and at least partially encases the support.

The support may be formed with keying formations to ensure a firm bond between the support and the scraping element.

The support may be shaped with ribs and hollows to save material and to enhance the rigidity of the support.

The support may include a base section and a curved section and the curved section may be embedded in the material of the scraping element.

In a variation of the invention the support includes a lower section in which is formed at least one aperture and clip formation at the aperture.

The invention also provides a scraper blade assembly which includes a mounting beam, a retaining pin on the beam, and a support of the aforementioned kind, the pin being located in the aperture and the clip formation being engaged with the retaining pin.

The invention further extends to a method of mounting a scraper blade to a support beam which includes the steps of positioning a portion of the blade between opposing members of support structure attached to the beam, moving the scraper blade so that a retaining pin of the support structure is located inside an aperture formed in the scraper blade, and allowing a clip formation in the scraper blade to engage with a catch formation in the pin thereby to secure the blade to the support beam.

BRIEF DESCRIPTION OF THE DRAWINGS

The invention is further described by way of examples with reference to the accompanying drawings in which:

FIG. 1 is a side view, partly sectioned, of a composite scraper blade according to the invention, FIG. 2 is a cross-sectional view of the blade of FIG. 1 taken on the line 2—2, FIG. 3 is an end view of a base portion of the scraper blade shown in FIG. 1, FIG. 4 is a cross-sectional side view of a lower end of a scraper blade, mounted to a support beam, according to a variation of the invention, and FIG. 5 is a front view of the arrangement shown in FIG. 4.

DESCRIPTION OF PREFERRED EMBODIMENTS

FIGS. 1 to 3 of the accompanying drawings illustrate a composite scraper blade 10 according to the invention which is particularly suited for use with a primary belt scraper although its use is not limited in any way. The manner in which a primary belt scraper is employed is known in the art and consequently is not further described herein.

The blade 10 includes a support 12 which is moulded from a suitable plastics material such as polyamide, and a scraping element 14 which is formed from a suitable polyurethane formulation.

The support 12 has a base section 16 which is formed with a plurality of ribs 18 and recesses 20 in order to impart to the support sufficient strength and rigidity while at the same time conserving material. Holes 22 and 24 extend through the base section 16.

The support 12 has a curved upper insert section 26. As is evident particularly from FIG. 2 the section 26 has a plurality of ribs 28 and grooves 30 over its surface.

The support 12 is preformed in a moulding process. The scraping element 14 is thereafter engaged with the support by locating the curved section 26 in a suitable mould and introducing polyurethane into the mould. The polyurethane bonds directly to the rib and groove surfaces of the insert section 26, which act as keying formations.

The element 14 has a shape and size which are determined by the scraping action required of the blade 10.

The blade 10 is mounted to a suitable support, not shown, by means of bolts which engage with the holes 22 and 24. The scraping element 14 has a leading scraping edge 32 which is brought into scraping contact with a conveyor belt at the head pulley of a conveyor installation. The blade 10, in use, is abraded and the element 14 is worn away from the edge 32 towards the insert section 26. The wear which takes place in the blade 10 is compensated for either automatically or by means of periodic manual adjustments of the blade relatively to the conveyor belt.

Ultimately a point is reached at which a leading end 34 of the insert section is also abraded. This is acceptable for the support 12 is made from a material such as polyamide which can abrade. The scraping action which can be obtained from polyamide is however not as good as the scraping action which is obtained from polyurethane.

Once the blade 10 has worn beyond a limiting state the blade is discarded and replaced with a fresh blade.

The benefit of the invention lies in the composite construction provided by the support 12 and the element 14 which are made from different materials with different properties. The bulk of the scraping action is achieved by means of the element 14 and, for this reason, the element is formed from a suitable material such as polyurethane. The polyurethane is abrasion resistant and has an inherent flexibility which allows it to deflect to accommodate irregularities in the belt surface which is being cleaned. The polyurethane is however more expensive than the polyamide from which the support 12 is formed. The polyamide is more rigid than the polyurethane and acts as a stiffening insert for the scraping element 14, providing a sound supporting structure at relatively lower cost. Thus when the blade 10 is ultimately discarded the relatively inexpensive material forms the bulk of the discarded blade. Conversely, as has been pointed out, the more expensive polyurethane which has desirable scraping properties is principally employed during the scraping lifetime of the blade.

Although it is preferred to embed the insert section 26 into the moulded polyurethane scraping element 14, this mode of construction is not essential and any other suitable way of fixing the scraping element to the support e.g. bolts, rivets, interengaging formations, may be employed. It is apparent as well that the shape and size of the blade 10 can be altered according to requirement. The curved shape of the insert enables the polyurethane to be shaped in a corresponding manner and so present a defined scraping surface to the belt.

FIGS. 4 and 5 illustrate from the side and front respectively the combination of a modified support 12A, and the manner in which the support is mounted to a support beam 40.

The lower end of the support 12A is formed with a section 42, which is similar to the section 12 shown in FIGS. 1 and 2, but wherein the holes 22 and 24 are altered in shape and size, as required, to form respective apertures 44, although only one aperture is shown in FIGS. 4 and 5. The aperture 44 has a rounded upper end 46, see FIG. 5, and a clip formation 48 at its lower end. A backing plate 50 extends from its base 51, to the beam 40 and a transversely extending retaining pin 52 extends laterally from the plate 50. The pin has a slot or catch formation 54 in its lower surface. The components may be welded to each other, as required, or any other suitable form of construction may be employed.

A stop plate 56 is located on one side of the beam 40. The support 12A is secured to the beam 40 by positioning the base 58 of the section 42 on the beam between the base 51 of the plate 50 and an opposing surface of the stop plate. The section 42 is then moved with a pivotal action, in the direction of an arrow 60, so that the retaining pin 52 enters the aperture 44. As the section is pushed towards the plate 50 the leading end of the pin forces the clip formation 48 downwardly, in the direction of an arrow 62. When the section reaches the position shown in FIG. 4 the clip formation enters the slot 54 and secures the support 12A to the beam 40. Thus the scraper blade may be fixed to the beam 40 without making use of tools.

In order to remove the blade a screwdriver or similar sharp implement is used to lever the clip formation downwardly, in the direction of the arrow 62, so that it disengages from the slot 54. The scraper blade may then be detached from the beam 40. The mounting arrangement therefore holds considerable benefits in that it facilitates installation and maintenance of a scraper assembly.

I claim:

1. A composite scraper blade which is suitable for use with a primary belt scraper which includes a support formed from a first plastics material and an abrasion resistant scraping element which is formed from a second material and which is moulded onto, and bonded to, the support and at least partially encases the support.

2. A scraper blade according to claim 1 wherein the second material is a second plastics material.

3. A scraper blade according to claim 1 wherein the first material is nylon or polyamide.

4. A scraper blade according to claim 1 wherein the second material is polyurethane.

5. A scraper blade according to claim 1 wherein the support includes a base section and a curved section and the curved section is engaged with the scraping element.

6. A scraper blade according to claim 5 wherein the base section includes formations for direct attachment to supporting structure.

7. A scraper blade according to claims 1 wherein the support includes a lower section in which is formed at least one aperture and a resilient clip formation at the aperture.

8. A scraper blade assembly which includes a mounting beam, a retaining pin on the beam, and a scraper blade according to claim 7, the pin being located in the aperture and the clip formation being engaged with the retaining pin.

9. A method of mounting a scraper blade to a support beam which includes the steps of positioning a portion of the blade between opposing members of support structure attached to the beam, moving the scraper blade so that a retaining pin of the support structure is located inside an aperture formed in the scraper blade, and allowing a resilient clip formation on the scraper blade to engage with a catch formation on the pin thereby to secure the blade to the support beam.

* * * * *